Patented Sept. 12, 1939

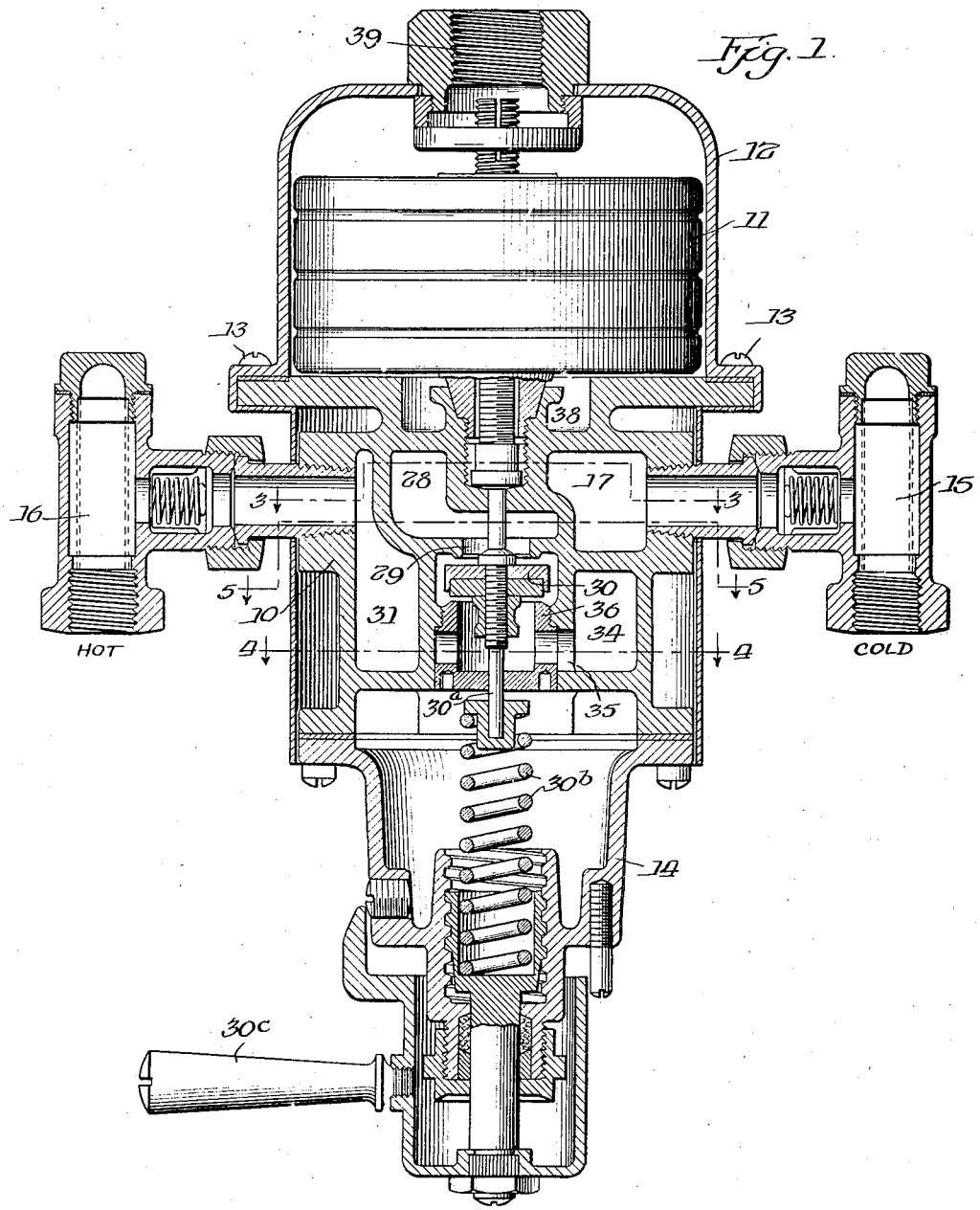

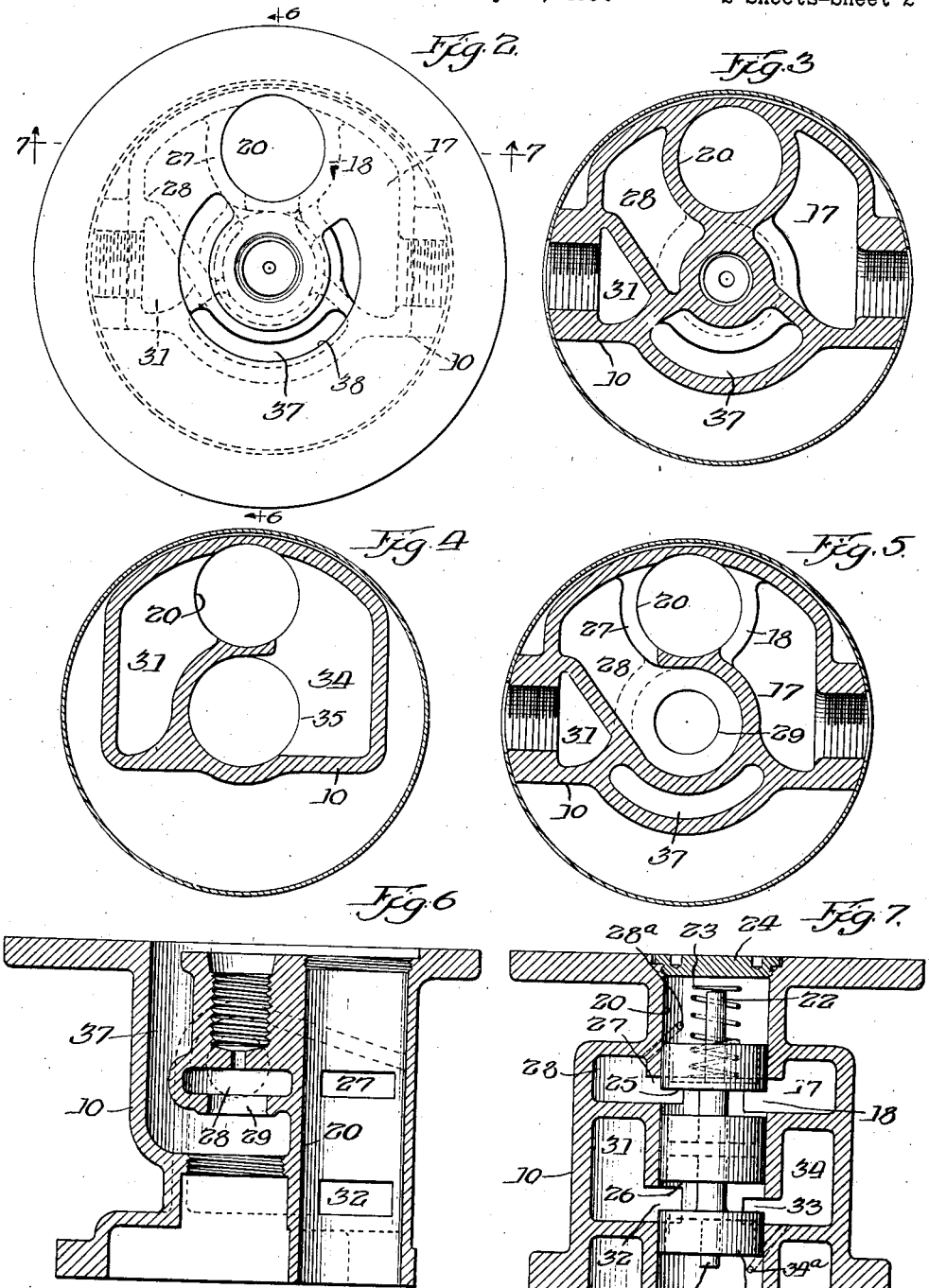

2,172,489

UNITED STATES PATENT OFFICE 2,172,489

COMBINED PRESSURE AND TEMPERATURE EQUALIZER

Howard J. Young, River Forest, Ill., assignor to The Powers Regulator Company, Chicago, Ill., a corporation of Illinois Application May 28, 1934, Serial No. 727,853

5 Claims. (Cl. 236—12)

My invention relates to temperature controlling devices, and particularly to a combined temperature and pressure controller for regulating the temperature of heated water.

It has been customary for some time past to provide a thermostatic regulator in a feed line for delivering water at a predetermined temperature to a battery of nozzles such as showers, faucets, etc., and such controllers operate with reasonable success where the delivery is fairly constant, and in sufficient volume to result in proper functioning of the regulator. However, where only one or two of the showers or outlets of a battery are in use, the regulator functions unsatisfactorily, there being a wide spread in the temperature limits of the water delivered therethrough. I have found that this results from an unequal pressure condition of the two intermixed fluids, and in order to meet the difficulty and to insure delivery of water at a substantially exact, predetermined temperature I have devised an apparatus in which I combine means for regulating both the temperature and the pressure of the incoming hot and cold fluids. The pressure controller may be of the type somewhat similar to that shown in the patent of Powers and Snediker, No. 1,508,938, of September 16, 1924, in which construction any unbalancing or fluctuation in the pressure of either of the two incoming fluids will result in an instant adjustment of the size of the entrance ports for the fluids. The novel features of the combination and the reasons for the specific arrangements will be discussed in connection with the accompanying description.

The invention will be more readily understood in connection with the accompanying drawings, in which:

Fig. 1 is a longitudinal, vertical, sectional view through apparatus constructed in accordance with my invention;

Fig. 2 is a plan view of the apparatus with the thermostat and hood removed;

Figs. 3, 4, 5, 6, and 7 are sectional views on the lines 3—3, 4—4, 5—5, 6—6, and 7—7, of Figs. 1 and 2.

In the drawings I have illustrated the apparatus as consisting of a main casing 10, preferably in the form of an elaborately cored casting, a thermostat shell 11, surrounded by a dome or hood 12, secured by screws 13 to the casing 10, and a hand regulator frame suitably secured to the lower end of the casing. The respective cold and hot fluid connections are provided with check valves 15—16.

In order to follow the path of travel of, first, the cold liquid, it will be seen that it enters the cored passage 17, in the casing 10, Fig. 1, shown also in Figs. 3, 5, and 7, and is delivered to the port 18, that is controlled by the sliding piston 19, Fig. 7. This piston slides freely within a cylinder 20, formed as part of the main casing, the open end of the cylinder being shown in Figs. 2, 3, 4, and 5, and a side view thereof in Fig. 6. The piston has stop pins 21—22 on its respective ends and a spring 23 surrounds the pin 22, and bears at one end against the piston and at the other end, against the plug 24 that serves to close the otherwise open end of the cylinder 20. The purpose of the spring will be discussed hereafter.

It will be noted that the piston has two circumferential grooves 25—26, the groove 25 acting to conduct the cold water from the port 18 to the port 27, and thence into the passage 28. This passage is clearly shown in Figs. 7, 5, and 1, and is open to the port 29 controlled by the valve member 30, Fig. 1.

I will now interrupt the description of the path of travel of the cold fluid in order to trace the travel of the hot fluid which enters through the check valve 16. The hot fluid enters the passage 31, best shown in Figs. 1, 4, and 7, and passes through the port 32, the groove 26 in the piston, to the outlet port 33, into the passage 34, which passage is best shown in Figs. 1 and 4. The fluid then enters the port 35, Fig. 1, and passes the valve member 30, over the end of the removable valve seat 36.

At this point we have followed the travel of the cold and hot liquids to a junction point at the mixing valve. By referring to Fig. 6 it will be seen that the mixed liquids, after passing valve 30 enter the passage 37, and then travel upward into the circular space 38, beneath the thermostat shell 11, then travel around the outer surfaces of the shell to the outlet 39 for the tempered liquid.

The valve 30 is carried by a stem 30a, connected at its upper end to the thermostat within the shell 11, and at its lower end engaged by a spring 30b, the compression of which is controlled by the operating handle 30c, all said parts being contained within the lower housing 14. In the event of an increase of temperature of the mixed liquids, the thermostatic element will expand and thus move the valve 30 toward its lower seat, thus restricting the hot fluid passage, and restoring the predetermined temperature condition in the out-going liquid. Conversely, of course, when the water is being delivered too cold the opposite action will take place.

By referring to Fig. 7, it will be seen that I provide small drilled passages 28a, 34a, between the passages 28 and 34 respectively to the space at the ends of the piston 19, so that the respective ends are always subject to the pressure of the respective fluids after passing the piston. Thus, in the event of any fluctuation of pressure of such fluids, a readjustment of the piston will immediately follow, restricting the size of the exit passage for the fluid having the dominant pressure, and increasing the size of the passage for the fluid of the lesser pressure. This results in a fine degree of regulation that insures a fairly constant temperature, notwithstanding fluctuation in the entrance pressures of the respective fluids, even without thermostatic control, it being assumed that the temperatures of the respective fluids are maintained substantially constant. However, in large installations this condition is not maintained and thermostatic control has been found to be highly desirable. When thermostatic control is employed for positioning a reciprocating mixing valve I have found that with an increase of temperature and a consequent movement of the mixing valve to practically a closed position relative to the entrance of the hot fluid, a back pressure develops that affects the equalizing piston and tends to shut off the hot fluid to a greater degree than is desirable. Consequently, I provide the compression spring 23, shown in Fig. 7, which is placed so as not to modify normal operation but to resist complete closing of the hot water exit port 33, and thereby to off-set the built-up pressure that follows the thermostatic action. As shown, the spring is normally inactive but as the piston approaches the point at which the stop pin will contact the end wall, the spring comes into action and resists the final closing movement.

While I have shown and described the spring 23 as provided only on one end of the piston, I may wish, in some instances, to provide springs on both ends, or on the "cold" end instead of the "hot" end; and I wish it to be so understood in construing the claims.

It will be noted that the port 18 is wider than the port 27, and the port 32 is wider than the port 33. In other words, the construction is such that when the piston has moved to a position to close either the port 27 or the port 33, the ports 18 and 32 are still partly open. This results in a much more satisfactory operation in the event of the complete failure of pressures of either the hot or cold fluids. By this means there results no locking or sticking of the piston 19 upon restoring of pressure; this for the reason that there will be sufficient leakage around the piston into the space at the end thereof that will ultimately restore it to its condition of balance.

The device as constructed is compact, and so arranged that all the parts are readily accessible for inspection and repair. The exact details of the arrangement are unimportant, and I do not wish to be limited except as indicated in the appended claims.

I claim:

1. In combination, a casing having inlets for hot and cold fluids and an outlet for the mixed fluids, a pressure equalizing piston mounted in said casing and arranged to permit the delivery of a volume of hot and cold fluids in proportion to the relative pressures thereof, a thermostatic member in the outlet passage for the mixed fluids, and a proportioning valve operated by said thermostatic member for delivering a quantity of the respective hot and cold fluids in the proper proportions to maintain a predetermined temperature of the mixed fluids, the position of the equalizing element in the casing being such that the fluids must first pass that element before being intermixed.

2. In a combined pressure and temperature controlling device, the combination of a casing providing inlet passages for hot and cold fluids, a mixing chamber at the termination of said inlet passages and an outlet passage leading from the mixing chamber, a cylinder formed in said casing, said cylinder being transversely intersected by said two inlet passages, a free moving piston in said cylinder, said piston having a pair of circumferential grooves so located that in one position of the piston the grooves register with, and act as, continuations of said passages, the respective ends of said piston being subject to the pressures of the respective hot and cold fluids, whereby the piston is positioned according to said relative pressures to permit delivery of fluids through said passages in proportion to the pressures of the fluids, and a thermostatically controlled proportioning valve in said mixing chamber.

3. In a combined pressure and temperature controlling device, the combination of a casing providing inlet passages for hot and cold fluids, a mixing chamber and an outlet passage leading therefrom, a cylinder formed in said casing, said cylinder intersecting said two inlet passages, a free moving piston in said cylinder, said piston having a pair of circumferential grooves so located that in one position of the piston the grooves act as continuations of said passages, the ends of said piston being subject to the pressure of the respective hot and cold fluids, whereby the piston is positioned to deliver fluids through said passages in proportion to the pressures of the fluids, spring means resisting the movement of the piston toward hot fluid restricting position, and a thermostatically controlled proportioning valve in said mixing chamber.

4. In a combined pressure and temperature controlling device, the combination of a casing providing inlet passages for hot and cold fluids, a mixing chamber at the termination of said inlet passages and an outlet passage leading from the mixing chamber formed in said casing, said cylinder being transversely intersected by said two inlet passages thereby providing an inlet and an outlet port at the junction points of each passage with the cylinder, a free moving piston in said cylinder, said piston having a pair of circumferential grooves so located that in one position the grooves register with, and act as, continuations of said passages, said inlet ports being of greater area relative to the piston grooves than the outlet ports whereby the inlet port is still open when the outlet port is closed, the respective ends of said piston being subject to the pressures of the respective hot and cold fluids, whereby the piston is positioned according to said relative pressures to permit delivery of fluids through said passages in proportion to the pressures of the fluids, and a thermostatically controlled proportioning valve in said mixing chamber.

5. In a combined pressure and temperature controlling device, the combination of a casing element consisting of an integral cored casting having a cylindrical chamber adapted to receive a pressure equalizing piston, means in said casting providing opposed valve seats, means in said casting providing passages communicating with hot and cold fluid inlets, and terminating at said respective seats, means in said casting providing an outlet for mixed hot and cold fluids, a valve operating between said seats and a thermostat in said outlet passage directly connected to said valve for positioning the same according to the temperature of the mixed fluids.

HOWARD J. YOUNG.